United States Patent
Suzuki

(10) Patent No.: US 9,767,688 B2
(45) Date of Patent: Sep. 19, 2017

(54) DRIVING ASSISTANCE APPARATUS AND DRIVING ASSISTANCE SYSTEM

(71) Applicant: DENSO CORPORATION, Kariya, Aichi-pref. (JP)

(72) Inventor: Takamitsu Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/312,076

(22) PCT Filed: May 29, 2015

(86) PCT No.: PCT/JP2015/002721
§ 371 (c)(1),
(2) Date: Nov. 17, 2016

(87) PCT Pub. No.: WO2015/190056
PCT Pub. Date: Dec. 17, 2015

(65) Prior Publication Data
US 2017/0084174 A1    Mar. 23, 2017

(30) Foreign Application Priority Data
Jun. 12, 2014    (JP) .................. 2014-121565

(51) Int. Cl.
*G08G 1/16* (2006.01)
*G08G 1/0965* (2006.01)
(Continued)

(52) U.S. Cl.
CPC ........... *G08G 1/0965* (2013.01); *B60W 30/00* (2013.01); *B60W 40/10* (2013.01); *G01S 13/00* (2013.01);
(Continued)

(58) Field of Classification Search
CPC ...... G08G 1/0965; G08G 1/166; G08G 1/162; G08G 1/161; G01S 13/00; G05D 1/0289;
(Continued)

(56) References Cited

U.S. PATENT DOCUMENTS

2003/0225511 A1    12/2003    Kushida et al.
2010/0274473 A1*   10/2010    Konishi ............ G01C 21/3697
                                                        701/532

(Continued)

FOREIGN PATENT DOCUMENTS

JP    H08216777 A    8/1996
JP    3773040 B2    5/2006
(Continued)

*Primary Examiner* — Dhaval Patel
(74) *Attorney, Agent, or Firm* — Harness, Dickey & Pierce P.L.C.

(57) ABSTRACT

A driving assistance apparatus mounted to a first vehicle is provided as follows. A situation determination section determines whether a situation requires compromise between the first vehicle and a nearby vehicle. A target vehicle specification section specifies a second vehicle as a target vehicle that requires compromise with the first vehicle. A scheduled action specification section specifies a scheduled action content of the first vehicle when the situation requiring compromise is determined by the situation determination section. A transmission processing section transmits the scheduled action content specified by the scheduled action specification section to the second vehicle. A reception processing section receives acceptance and refusal information indicating acceptance or refusal of the scheduled action content from the second vehicle. A notification processing section issues a notification indicating whether the driver of the second vehicle accepts the scheduled action content, based on the received acceptance and refusal information.

18 Claims, 7 Drawing Sheets

(51) Int. Cl.
  *B60W 30/00* (2006.01)
  *B60W 40/10* (2012.01)
  *G01S 13/00* (2006.01)
  *G05D 1/02* (2006.01)
  *G06K 9/00* (2006.01)
  *H04W 4/02* (2009.01)
  *H04W 84/00* (2009.01)

(52) U.S. Cl.
  CPC ....... *G05D 1/0289* (2013.01); *G06K 9/00791* (2013.01); *G08G 1/161* (2013.01); *G08G 1/162* (2013.01); *G08G 1/166* (2013.01); *H04W 4/02* (2013.01); *H04W 84/005* (2013.01); *G05D 2201/0213* (2013.01)

(58) Field of Classification Search
  CPC ...... G05D 2201/0213; G06K 9/00791; B60W 30/00; B60W 40/10; H04W 4/02; H04W 84/005

USPC ......... 340/435, 506, 425.5, 905, 906; 701/2, 701/45, 71, 36, 118, 19, 470
  See application file for complete search history.

(56) References Cited

U.S. PATENT DOCUMENTS

| | | | |
|---|---|---|---|
| 2012/0176254 A1* | 7/2012 | Imanaga | G01C 21/3407 340/902 |
| 2015/0170429 A1* | 6/2015 | Denny | B60W 30/09 701/36 |

FOREIGN PATENT DOCUMENTS

| | | |
|---|---|---|
| JP | 2007316772 A | 12/2007 |
| JP | 2010231339 A | 10/2010 |

* cited by examiner

DRIVING ASSISTANCE APPARATUS AND DRIVING ASSISTANCE SYSTEM

CROSS REFERENCE TO RELATED APPLICATIONS

This application is a U.S. National Phase Application under 35 U.S.C. 371 of International Application No. PCT/JP2015/002721 filed on May 29, 2015 and published in Japanese as WO 2015/190056 A1 on Dec. 17, 2015. This application is based on and claims the benefit of priority from Japanese Patent Application No. 2014-121565 filed on Jun. 12, 2014. The entire disclosures of all of the above applications are incorporated herein by reference.

TECHNICAL FIELD

The present disclosure relates to a driving assistance apparatus to assist vehicles in giving way to each other and a driving assistance system including the driving assistance apparatus.

BACKGROUND ART

There is known a technique that transmits an intention of a driver of a first vehicle to a driver of a second vehicle in a situation that requires vehicles to give way to each other.

Patent literature 1 discloses such technique of a first vehicle cutting in ahead of another second vehicle for a lane change. Here, the driver of the first vehicle tries to cut in ahead of the second vehicle and thus notifies the driver of the second vehicle of an intention trying to cut in ahead of the second vehicle by operating a turn signal lamp of the first vehicle.

In response, the driver in the second vehicle notifies the driver of the first vehicle of an intention permitting the first vehicle to cut in ahead of the second vehicle, by maintaining a cut-in space without acceleration of the second vehicle or increasing a cut-in space with deceleration of the second vehicle.

PRIOR ART LITERATURES

Patent Literature

Patent literature 1: JP H08-216777 A

SUMMARY OF INVENTION

In some cases, drivers however fail to correctly exchange their intentions taking action with each other in a situation that requires vehicles to give way to each other, as described in detail below.

A beginner driver or an unexperienced driver may be in the first vehicle trying to cut in ahead of the second vehicle. Such a driver may fail to perceive an intention of the driver of the second vehicle giving way the course to the first vehicle by maintaining a cut-in space without acceleration or increasing a cut-in space with deceleration.

It is an object of the disclosure to provide a driving assistance apparatus and a driving assistance system capable of allowing drivers to more reliably transmit their intentions to each other in a situation that requires vehicles to give way to each other.

According to an example of the present disclosure, a driving assistance apparatus mounted to a vehicle is provided as including: a transmission processing section that transmits information to a nearby vehicle from the vehicle using inter-vehicle communication; a reception processing section that receives information transmitted from a nearby vehicle using inter-vehicle communication; a notification processing section that issues a notification to a driver of the vehicle; a situation determination section that determines whether a situation requires compromise between the vehicle and a nearby vehicle; a target vehicle specification section that specifies a target vehicle as the nearby vehicle that requires compromise with the vehicle; and a scheduled action specification section that specifies a scheduled action content of the vehicle in a situation that is determined by the situation determination section to require compromise. Herein, the transmission processing section transmits the scheduled action content specified by the scheduled action specification section to the target vehicle. When the reception processing section receives acceptance and refusal information indicating one of acceptance and refusal of the scheduled action content from the target vehicle in response to the scheduled action content transmitted from the transmission processing section, the notification processing section issues a notification indicating whether a driver of the target vehicle accepts the scheduled action content based on the received acceptance and refusal information.

In a situation that requires compromise between the vehicle and the nearby vehicle, the inter-vehicle communication transmits a scheduled action content of the vehicle appropriate for the situation to the target vehicle requiring compromise with the vehicle. The scheduled action content enables the driver of the target vehicle to perceive an intention of the driver of the vehicle.

In response to the transmitted scheduled action content, the reception processing section receives the acceptance and refusal information indicating acceptance or refusal of the scheduled action content from the target vehicle. Based on the received acceptance and refusal information, the driver of the vehicle may be supplied with a notification indicating whether the driver of the target vehicle accepts the scheduled action content. The driver of the vehicle can more reliably confirm whether the driver of the target vehicle accepts or refuses the scheduled action content. Thus, the drivers can more reliably transmit their intentions to each other in a situation that requires compromise between vehicles.

According to another example of the present disclosure, a driving assistance system is provided to include a first driving assistance apparatus mounted to a first vehicle and a second driving assistance apparatus mounted to a nearby vehicle that surrounds the first vehicle. The first driving assistance apparatus includes: a first transmission processing section that transmits information from the first vehicle using inter-vehicle communication; a first reception processing section that receives information transmitted using inter-vehicle communication; a first notification processing section that issues a notification to a driver of the vehicle; a situation determination section that determines whether a situation requires compromise between the first vehicle and the nearby vehicle; a target vehicle specification section that specifies a second vehicle as the nearby vehicle that requires compromise with the first vehicle; and a scheduled action specification section that specifies a scheduled action content of the first vehicle in a situation that is determined by the situation determination section to require compromise. Herein, the first transmission processing section transmits the scheduled action content specified by the scheduled action specification section to the second vehicle. The second driving assistance apparatus includes a second transmission processing section that transmits information from the second vehicle using inter-vehicle communication; a second reception processing section that receives information transmitted using inter-vehicle communication; a second notification processing section that issues a notification indicating the scheduled action content of the first vehicle to a driver of the second vehicle when the scheduled action content transmitted from the first vehicle to the second vehicle is received by the second reception processing section; and an acceptance and refusal determination section that determines whether a driver of the second vehicle accepts the scheduled action content of the first vehicle when the scheduled action content transmitted from the first vehicle to the second vehicle is received by the second reception processing section. Herein, the second transmission processing section transmits, to the first vehicle, acceptance and refusal information indicating whether the acceptance and refusal determination section determines that the driver of the second vehicle accepts the scheduled action content of the first vehicle. When the acceptance and refusal information from the second vehicle is received by the first reception processing section of the first vehicle, the first notification processing section of the first vehicle issues, to the driver of the first vehicle, a notification indicating whether the driver of the second vehicle accepts the scheduled action content based on the received acceptance and refusal information.

In a situation that requires compromise between the first vehicle and the second vehicle, the first vehicle uses the inter-vehicle communication to transmit the scheduled action content of the first vehicle in this situation to the second vehicle. In the second vehicle, a notification indicating the scheduled action content is issued to the driver of the second vehicle. The driver of the second vehicle can more reliably recognize the intention of the driver of the first vehicle.

The first vehicle receives the acceptance and refusal information indicating acceptance or refusal of the scheduled action content from the second vehicle. Based on the received acceptance and refusal information, the driver of the first vehicle may be supplied with a notification indicating whether the driver of the second vehicle accepts the scheduled action content. The driver of the first vehicle can more reliably confirm whether the driver of the second vehicle accepts or refuses the scheduled action content. Thus, the drivers can more reliably transmit their intentions to each other in a situation that requires compromise between vehicles.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments of the disclosure will be described with reference to the accompanying drawings. The embodiments described below apply to a community that legislates the left-hand traffic. The right and the left in the embodiments are reversed in a community that legislates the right-hand traffic.

First Embodiment

<Schematic Configuration of Driving Assistance System 100>

Figure 1:
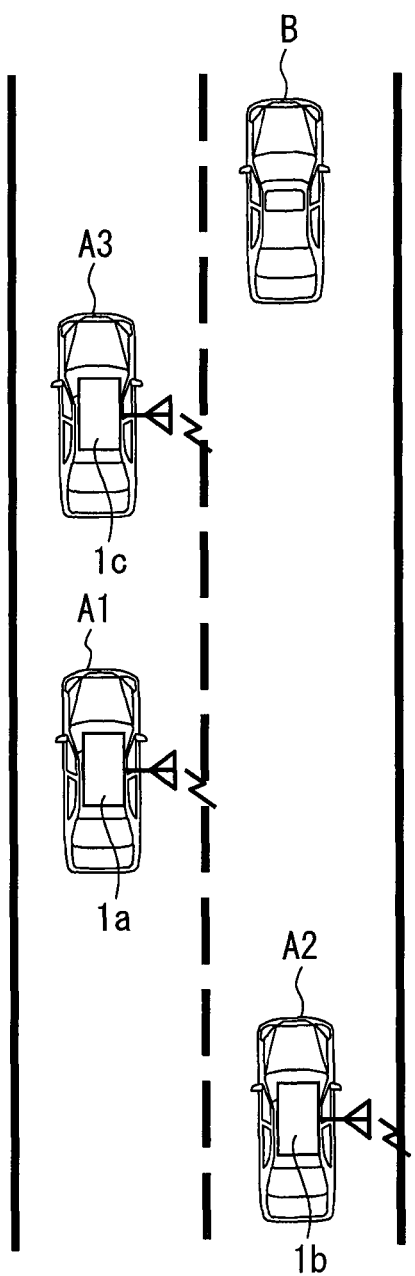
FIG. 1 is a diagram illustrating a schematic configuration of a driving assistance system.

FIG. 1 is a diagram illustrating a schematic configuration of a driving assistance system 100 according to a first embodiment. The driving assistance system 100 in FIG. 1 includes three driving assistance units 1a, 1b, and 1c that are each mounted on vehicles (A1 through A3). Each of vehicles A1 through A3 is also simply referred to as a vehicle. Each of vehicles A1 through A3 is also referred to as a host vehicle or a subject vehicle in relation to each of driving assistance units 1a, 1b, and 1c. When a subject apparatus is mounted on a vehicle, the vehicle is also referred to as a host vehicle or a subject vehicle in relation to the subject apparatus. Driving assistance units 1a, 1b, and 1c mounted on the corresponding vehicles have the same function. If not distinguished from each other, driving assistance units 1a, 1b, and 1c are described as a driving assistance unit 1. Vehicle B in FIG. 1 is not mounted with the driving assistance unit 1.

The driving assistance system 100 in FIG. 1 includes the three driving assistance units 1 but is not limited thereto. The driving assistance system 100 may include the three or more driving assistance units 1 mounted on the vehicles. For convenience sake, however, the description below explains that the driving assistance system 100 includes the three driving assistance units 1 each one of which is mounted on each of vehicles A1 through A3.

<Schematic Configuration of Driving Assistance Unit 1>

Figure 2:
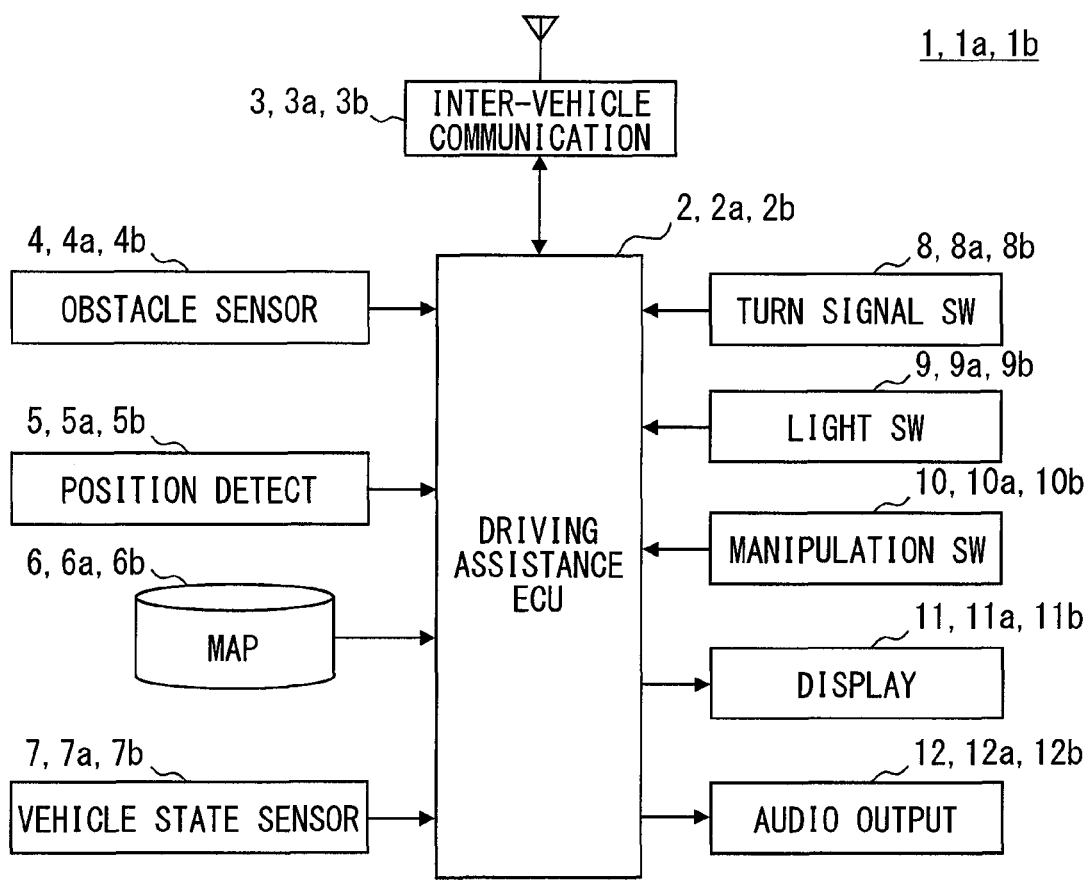
FIG. 2 is a block diagram illustrating a schematic configuration of a driving assistance unit.

As in FIG. 2, the driving assistance unit 1 includes a driving assistance ECU 2, an inter-vehicle communication section 3, an obstacle sensor group 4, a position detector 5, a map database (DB) 6, a vehicle state sensor group 7, a turn signal lamp switch 8, a light switch 9, a manipulation switch group 10, a display apparatus 11, and an audio output apparatus 12.

The inter-vehicle communicator 3 includes a transmitting and receiving antenna and exchanges information with the driving assistance units 1 mounted on other vehicles using broadcast-based wireless communication without using a communication network. Namely, the inter-vehicle communicator 3 performs inter-vehicle communication. The inter-vehicle communication can use a radio wave of 700 MHz or 5.9 GHz band.

The obstacle sensor group 4 is mounted on a vehicle and includes various obstacle sensors to detect obstacles such as a nearby vehicle around a host vehicle. The obstacle sensor group 4 includes obstacle sensors such as a millimeter-wave radar, a lidar, a sonar, and a camera. According to the embodiment, the obstacle sensor group 4 uses a combination of sensors for different detection ranges to detect all orientations around the host vehicle.

The position detector 5 successively detects a current position of the host vehicle using a positioning system that detects a current position of the host vehicle based on a radio wave from a positioning satellite, for example. A current position of the host vehicle is represented by coordinates of longitude and latitude, for example.

The map DB 6 stores map data such as road data containing node data and link data. Each road on an electronic map is divided into links at nodes such as intersecting, branching, or joining points. A link connects nodes with each other. The link data includes a unique number (link ID) to specify a link, coordinates (longitude and latitude) for start and end nodes of a link, a road type, a road width, and the number of lanes. The node data includes a node ID as a unique number assigned to each node on the map, a node coordinate, a node name, a connection link ID to describe a link ID of a link connected to the node, and an intersection type.

The vehicle state sensor group 7 provides various sensors to detect a vehicle state of the host vehicle. The vehicle state sensor group 7 includes a vehicle speed sensor to detect a vehicle speed of the host vehicle, a brake stroke sensor to detect an acceleration/deceleration of the host vehicle by detecting the amount of braking effort applied to a brake pedal of the host vehicle, and a steering angle sensor to detect a steering angle of the host vehicle.

The turn signal lamp switch 8 detects driver's manipulation to turn on a turn signal lamp of the host vehicle (i.e., manipulation to turn on the turn signal lamp). The turn signal lamp switch 8 is provided to detect the manipulation of turning on each of the right and left turn signal lamps. When the manipulation to turn on the turn signal lamp is performed, the turn signal lamp switch 8 outputs a signal indicating which of the right and left turn signal lamps is manipulated to turn on.

The light switch 9 detects manipulation of turning on or off a headlight of the host vehicle, switching a light axis of the headlight between upward and downward (i.e., switching between high beam and low beam), or headlight flashing by momentarily changing the light axis of the headlight upward. The light switch 9 outputs a signal corresponding to the driver's manipulation.

The manipulation switch group 10 provides mechanical switches near a steering wheel. The driver manipulates the manipulation switch group 10 to configure various settings.

The display apparatus 11 displays text or an image based on a directive from the driving assistance ECU 2. The display apparatus 11 is capable of full-color display and can use a liquid crystal display. The display apparatus 11 may use a display provided for an instrument panel or an HUD (Head-Up Display). The audio output apparatus 12 includes a speaker and generates a sound based on a directive from the driving assistance ECU 2.

The driving assistance ECU 2 is mainly configured as a microcomputer that includes a known CPU, a memory unit such as ROM or RAM, I/O, and a bus line to connect these components. The driving assistance ECU 2 corresponds to the driving assistance apparatus. The driving assistance ECU 2 performs various processes based on various information supplied from the inter-vehicle communicator 3, the obstacle sensor group 4, the position detector 5, the map DB 6, the vehicle state sensor group 7, the turn signal lamp switch 8, the light switch 9, and the manipulation switch group 10.

The driving assistance ECU 2 performs a compromise acceptance and refusal confirmation-related process. The compromise acceptance and refusal confirmation-related process concerns a process that transmits a scheduled action content of the host vehicle to the other vehicle and receives driver's acceptance or refusal of the other vehicle concerning the scheduled action content in a situation that requires vehicles to give way to each other. Further, the driving assistance ECU 2 performs a compromise acceptance and refusal transmission-related process. The compromise acceptance and refusal transmission-related process concerns a process that transmits driver's acceptance or refusal of the host vehicle concerning a scheduled action content if transmitted from the other vehicle in a situation that requires vehicles to give way to each other.

All or part of functions provided by the driving assistance ECU 2 may be implemented on one or more IC chips as hardware.

<Detailed Configuration of Driving Assistance ECU 2>

Figure 3:
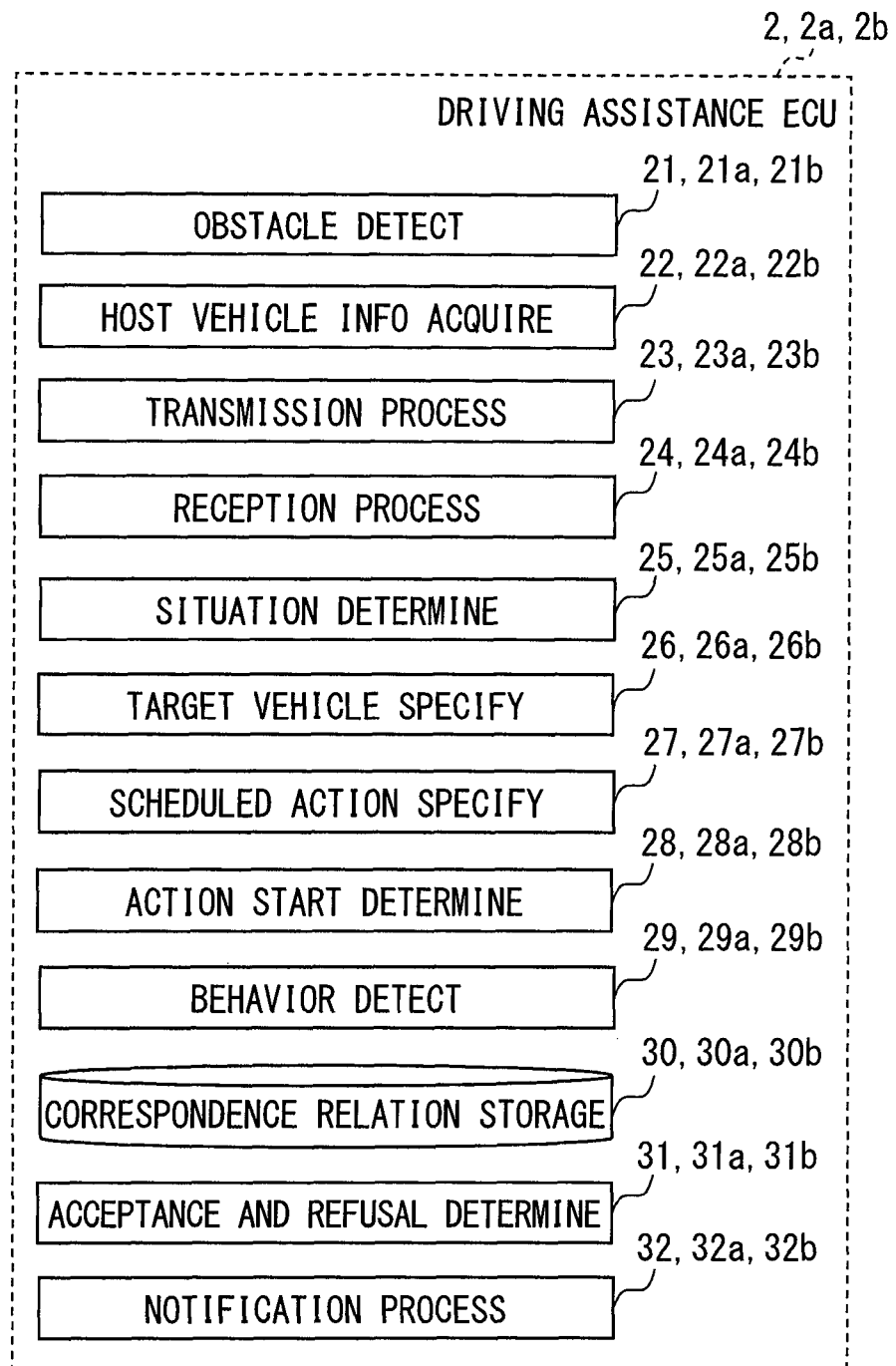
FIG. 3 is a block diagram illustrating a schematic configuration of a driving assistance ECU according to a first embodiment.

As in FIG. 3, the driving assistance ECU 2 includes an obstacle detection section 21, a host vehicle information acquisition section 22, a transmission processing section 23, a reception processing section 24, a situation determination section 25, a target vehicle specification section 26, a scheduled action specification section 27, an action start determination section 28, a behavior detection section 29, a correspondence relation storage 30, an acceptance and refusal determination section 31, and a notification processing section 32.

The obstacle detection section 21 detects an obstacle around the host vehicle and a relative position or a relative speed of the obstacle with reference to the host vehicle based on a signal from the obstacle sensor group 4. According to the embodiment, the obstacle detection section 21 specifically detects a vehicle as an obstacle.

Suppose that the obstacle sensor group 4 provides a millimeter-wave radar, a lidar, or a sonar. In this case, the obstacle detection section 21 detects an obstacle when a reflected wave is received in response to a probe wave. The obstacle detection section 21 detects a direction of the obstacle with reference to the host vehicle based on the direction of transmitting the probe wave that causes the reflected wave. The obstacle detection section 21 detects a distance from the host vehicle to the obstacle based on a time interval from transmitting the probe wave to receiving the reflected wave. Suppose that the obstacle sensor group 4 provides a radar. In this case, the obstacle detection section 21 may detect a relative position with reference to the host vehicle using a phase monopulse radar. A publicly known method may be used to detect a relative speed based on the Doppler shift between the probe wave and the reflected wave. The obstacle detection section 21 can identify an obstacle as a vehicle based on the size or the outline of a detected obstacle or motion or motionlessness found from a relative speed.

Suppose that the obstacle sensor group 4 provides a camera. In this case, the obstacle detection section 21 detects a vehicle based on a publicly known pattern matching technique. The obstacle detection section 21 can detect an orientation or a distance (i.e., a relative position) with reference to the host vehicle based on the position in a captured image if a camera installation position and an optical axis orientation are fixed with reference to the host vehicle. The obstacle detection section 21 detects a relative position of a nearby vehicle with reference to the host vehicle based on the camera installation position and the optical axis orientation with reference to the host vehicle and the position in the captured image. Suppose that the obstacle sensor group 4 provides a stereo camera. In this case, the obstacle detection section 21 may detect a distance to a vehicle with reference to the host vehicle based on a parallax between a pair of cameras. The obstacle detection section 21 may detect a relative speed based on a variation of vehicle sizes in successively captured images.

The host vehicle information acquisition section 22 successively acquires vehicle information such as a host vehicle's position, traveling direction, manipulation amount, and momentum from the position detector 5 or the vehicle state sensor group 7.

The host vehicle position includes at least a current position of the host vehicle. The host vehicle information acquisition section 22 may acquire the current position of the host vehicle from the position detector 5. The position information may include past positions as well as the current position of the host vehicle. The host vehicle information acquisition section 22 may store detection results of several current positions in the past detected by the position detector 5 and thereby acquire the current positions in the past as past positions.

A traveling direction of the host vehicle signifies an orientation of the host vehicle, for example. To acquire a host vehicle orientation, the least-square method may be used to find an approximate line from chronologically placed several positions of the host vehicle. The host vehicle information acquisition section 22 may acquire the host vehicle orientation as an orientation along which the approximate line extends. The host vehicle information acquisition section 22 may acquire the host vehicle orientation from a geomagnetic sensor if included in the vehicle state sensor group 7. The orientation may be used with reference to the north.

The manipulation amount of the host vehicle signifies a steering angle, for example, and is acquired from the steering angle sensor. The momentum of the host vehicle signifies a vehicle speed or an acceleration/deceleration, for example. The vehicle speed may be acquired from the vehicle speed sensor. The acceleration/deceleration may be acquired from an acceleration/deceleration sensor. Alternatively, the acceleration/deceleration may be acquired by differentiating a vehicle speed.

The transmission processing section 23 allows the inter-vehicle communicator 3 to cyclically (e.g., every 100 msec) transmit vehicle information acquired by the host vehicle information acquisition section 22. The transmission processing section 23 may allow the inter-vehicle communicator 3 to transmit the vehicle information attached with a time stamp that indicates the time to have detected each information contained in the vehicle information, for example. The transmission processing section 23 may allow the inter-vehicle communicator 3 to transmit the vehicle information attached with identification information, such as a vehicle ID or a temporary ID of the host vehicle, capable of identifying a source of transmitting the vehicle information.

The vehicle information is successively transmitted from the inter-vehicle communicator 3 of the driving assistance unit 1 mounted on a nearby vehicle within a range capable of the inter-vehicle communication. The reception processing section 24 receives the transmitted vehicle information via the inter-vehicle communicator 3 of the host vehicle. The reception processing section 24 specifies each of nearby vehicles capable of the inter-vehicle communication based on the identification information attached to the received vehicle information.

The situation determination section 25, the target vehicle specification section 26, the scheduled action specification section 27, the action start determination section 28, the behavior detection section 29, the correspondence relation storage 30, the acceptance and refusal determination section 31, and the notification processing section 32 will be described in detail later.

The description below explains the compromise acceptance and refusal confirmation-related process and the compromise acceptance and refusal transmission-related process mentioned above. As an example, vehicle A1 in FIG. 1 is assumed to transmit a scheduled action content. Vehicle A2 in FIG. 1 is assumed to transmit acceptance or refusal of the scheduled action content. Vehicle A1 is also referred to as a first vehicle. Vehicle A2 is also referred to as a second vehicle.

In the following description, a reference number of a member is suffixed by "a" when the member is included in a driving assistance unit 1a mounted on vehicle A1. A reference number of a member is suffixed by "b" when the member is included in a driving assistance unit 1b mounted on vehicle A2. The driving assistance ECU 2 of vehicle A1 is denoted as a driving assistance ECU 2a. The transmission processing section 23 of vehicle A1 is denoted as a transmission processing section 23a. Therefore, the driving assistance ECU 2a corresponds to a first driving assistance apparatus. A driving assistance ECU 2b corresponds to a second driving assistance apparatus.

<Compromise Acceptance and Refusal Confirmation-Related Process>

The description below explains a sequence of the above-mentioned compromise acceptance and refusal confirmation-related process in the driving assistance ECU 2a with reference to a flowchart in FIG. 4.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device or module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

Figure 4:
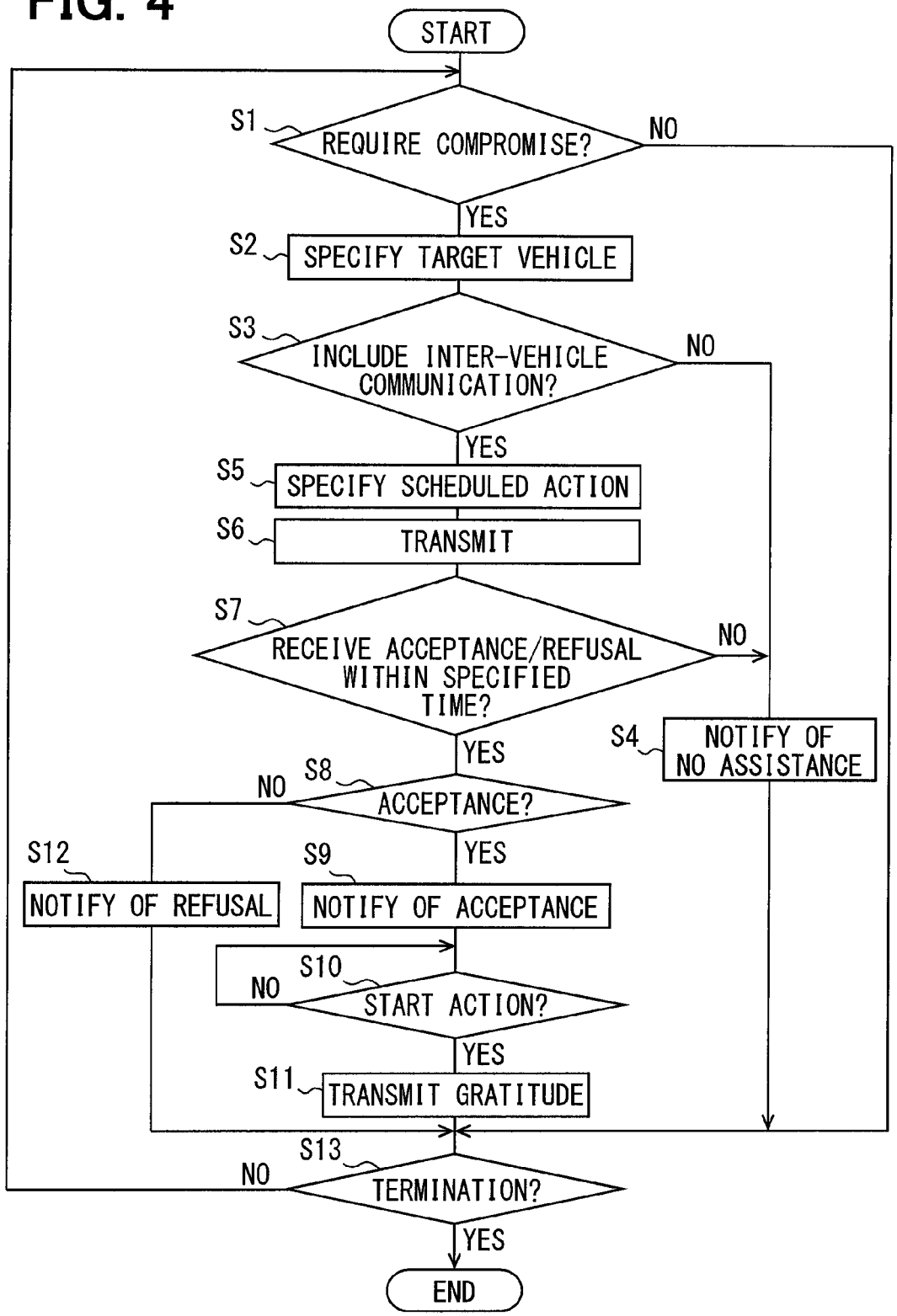
FIG. 4 is a flowchart illustrating a sequence of a compromise acceptance and refusal confirmation-related process in the driving assistance ECU.

The flowchart in FIG. 4 is assumed to start when an ignition power supply in vehicle A1 as the host vehicle turns on.

At S1, the situation determination section 25a determines whether a situation requires compromise between the host vehicle and a nearby vehicle, based on a detection result from the obstacle detection section 21a, vehicle information acquired by the host vehicle information acquisition section 22a, a signal from the turn signal lamp switch 8a, a signal from the light switch 9a, and map data stored in the map DB 6a.

Figure 5:
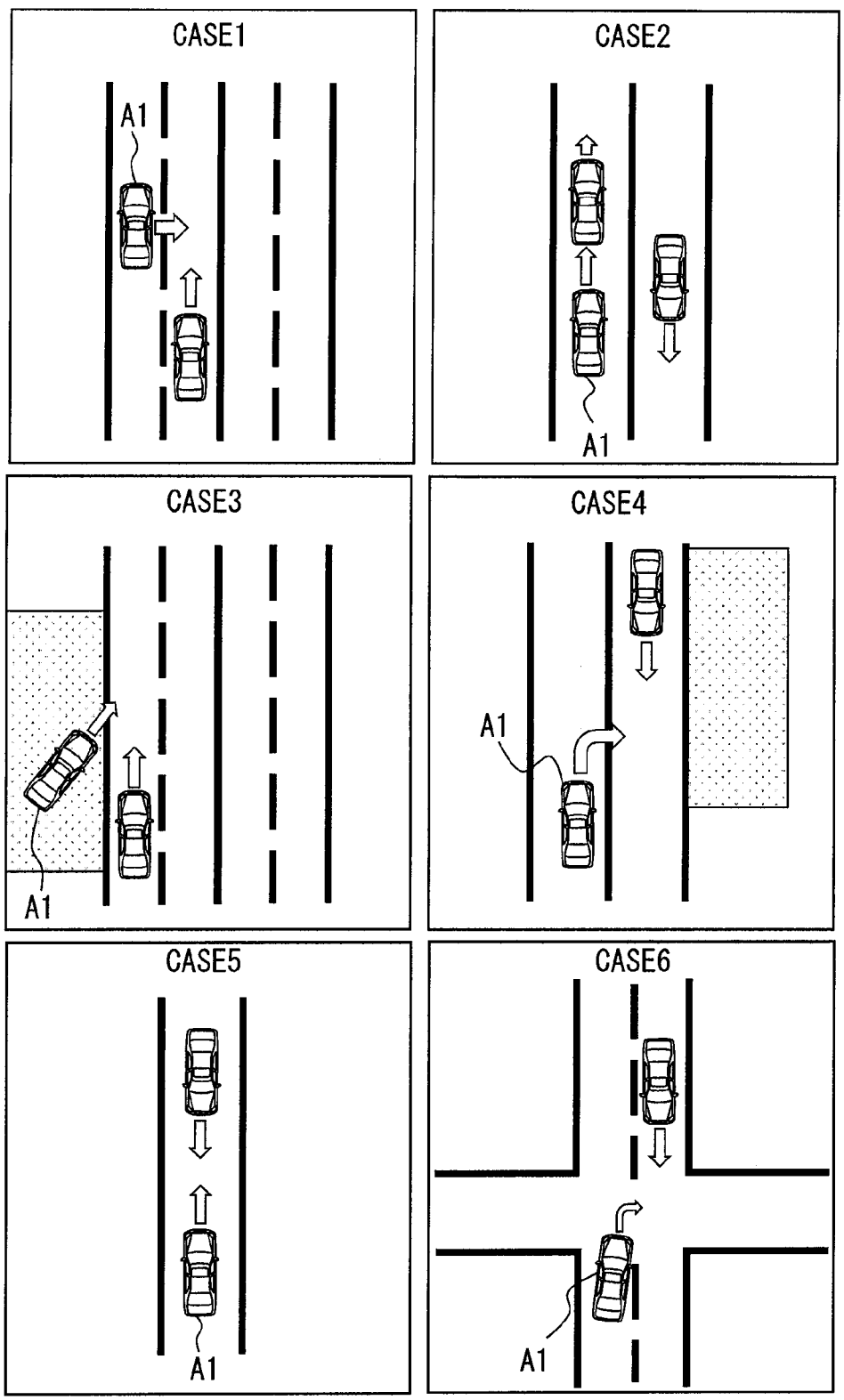
FIG. 5 is a schematic diagram illustrating cases where a situation determination section determines necessity of compromise.

The situation to require compromise causes possible crossing between a traffic line of vehicle A1 and a traffic line of the nearby vehicle. CASE1 through CASE5 in FIG. 5 illustrate this situation. CASE1 illustrates cutting into the other's lane to change the lane. A nearby vehicle exists behind vehicle A1 on the lane as a lane change destination. In CASE2, the host vehicle is going to pass a preceding vehicle on a double lane. In CASE3, the host vehicle is going to enter a main road from a parking area in a facility, a ramp-shaped road, or a side road and a nearby vehicle is approaching on the main road. In CASE4, the host vehicle is going to enter a parking area in a facility across an opposite lane and an oncoming vehicle is approaching on the opposite lane from ahead of the host vehicle. In CASE5, the host vehicle runs into an oncoming vehicle on a narrow road without centerline. In CASE6, the host vehicle runs into an oncoming vehicle while waiting to turn right at an intersection.

A cut-in situation during the lane change can be determined based on the fact that: while the turn signal lamp switch 8a inputs a signal indicating manipulation to turn on the turn signal lamp, a lane exists on the side corresponding to the operated turn signal lamp in the same traveling direction as the lane where vehicle A1 is positioned; and, simultaneously, the obstacle detection section 21a detects a vehicle behind on the side corresponding to the operated turn signal lamp. The position of vehicle A1 contained in the vehicle information and the map data can verify that the lane exists on the side corresponding to the operated turn signal lamp in the same traveling direction as the lane where vehicle A1 is positioned.

The situation where the host vehicle is going to pass a preceding vehicle on a double lane can be determined based on the fact that: while the obstacle detection section 21a detects a vehicle ahead of vehicle A1, vehicle A1 is positioned at the double lane; and, simultaneously, the light switch 9a inputs a signal indicating that the headlight was flashed. The position of vehicle A1 contained in the vehicle information and the map data can verify that vehicle A1 is positioned at the double lane.

The situation where a nearby vehicle is approaching on the road to enter can be determined based on: the position and the traveling direction of vehicle A1 contained in the vehicle information; the map data; and the relative position of the vehicle detected by the obstacle detection section 21a with reference to vehicle A1.

The situation where the host vehicle runs into an oncoming vehicle on a narrow road without centerline can be determined based on: the position of vehicle A1 contained in the vehicle information; the map data; and the determination whether a preceding vehicle detected by the obstacle detection section 21a is oncoming. The situation where the host vehicle runs into an oncoming vehicle while waiting to turn right at an intersection can be determined based on the fact that: while vehicle A1 is positioned near the intersection, the turn signal lamp switch 8a inputs a signal indicating manipulation to turn on the turn signal lamp to the right; and, simultaneously, the obstacle detection section 21a detects an oncoming vehicle ahead of vehicle A1. The obstacle detection section 21a can determine whether a vehicle is oncoming, by using a camera as the obstacle sensor group 4a and using the pattern matching technique to detect whether a vehicle is oncoming.

At S2 back in FIG. 4, the target vehicle specification section 26a specifies a target vehicle with which vehicle A1 needs to compromise. Specifically, the target vehicle specification section 26a specifies the target vehicle using the nearest one of vehicles whose traffic lines are likely to cross the traffic line of vehicle A1. The example in the embodiment specifies the target vehicle using the nearest vehicle positioned after vehicle A1 on a lane to which vehicle A1 is going to change the lane.

At S3, the target vehicle specification section 26a specifies the target vehicle specified at S2 out of nearby vehicles whose vehicle information the reception processing section 24a receives. As an example, the target vehicle specification section 26a specifies the target vehicle using a nearby vehicle that transmits the vehicle information containing a position that approximately matches a position found from the relative position of a target vehicle detected by the obstacle detection section 21a with reference to vehicle A1 almost at the same time. The time stamp at the time to detect a position is used for positional correspondence between vehicle A1 and the nearby vehicle at the same time. No target vehicle is specified if the target vehicle specified at S2 is not mounted with an apparatus to perform the inter-vehicle communication.

The processing passes to S5 if the target vehicle is specified at S3, namely, if the target vehicle includes the inter-vehicle communication function (S3: YES). The processing passes to S4 if no target vehicle is specified at S3, namely, if the target vehicle does not include the inter-vehicle communication function (S3: NO).

At S4, a notification processing section 32a issues a notification from a display apparatus 11a or an audio output apparatus 12a to notify a driver of vehicle A1 that the driving assistance ECU 2a provides no assistance in a situation to require compromise. The notification indicating that the driving assistance ECU 2a provides no assistance signifies the driver alone needs to confirm the vicinity to take action, for example. The notification processing section 32a corresponds to a first notification processing section.

The driver of vehicle A1 can recognize that the driving assistance ECU 2a provides no assistance when the driving assistance ECU 2a provides no assistance in a situation to require compromise. The driver can promptly resort to his or her own decision. This can prevent the driver from losing the timing to take action while awaiting an unavailable assistance.

The notification processing section 32 favorably provides only audible notification or, if necessary, simple visual notification using an icon so as not to hinder the driver's driving. The same applies to the following description.

The processing passes to S5 if the target vehicle includes the inter-vehicle communication function. At S5, a scheduled action specification section 27a specifies an action content (hereinafter referred to as a scheduled action content) scheduled by vehicle A1. Scheduled action contents are associated with each other in a table, for example, corresponding to situations determined by the situation determination section 25a. The scheduled action specification section 27a may specify a scheduled action content according to a situation determined by the situation determination section 25a.

A scheduled action content in CASE1 or CASE3 may be defined as "cutting in ahead of a target vehicle." A scheduled action content in CASE2 may be defined as "passing a target vehicle." A scheduled action content in CASE4 may be defined as "crossing ahead of a target vehicle." A scheduled action content in CASE5 or CASE6 may be defined as "going before a target vehicle."

At S6, the transmission processing section 23a transmits the vehicle information acquired by the host vehicle information acquisition section 22a from the inter-vehicle communicator 3a at a specified cycle. At this time, the transmission processing section 23a supplements the vehicle information to be transmitted with the scheduled action content specified at S5 and the identification information about the target vehicle specified at S3. The identification information about the target vehicle, to be used, is contained in the vehicle information already received from the target vehicle specified at S3. The transmission processing section 23a corresponds to a first transmission processing section.

At S7, the reception processing section 24a may receive the vehicle information supplemented with acceptance and refusal information from the target vehicle specified at S3 within a specified time from the transmission of the vehicle information supplemented with the scheduled action content at S6 (S7: YES). The acceptance and refusal information indicates whether the scheduled action content is accepted or refused. In this case, the driving assistance ECU 2a proceeds to S8. The reception processing section 24a may not receive the vehicle information supplemented with the acceptance and refusal information from the target vehicle within the specified time (S7: NO). In this case, the driving assistance ECU 2a returns to S4 to repeat the process. The reception processing section 24a corresponds to a first reception processing section.

Suppose that the target vehicle has the inter-vehicle communication function but is not mounted with the driving assistance unit 1. In this case, the target vehicle does not transmit the vehicle information supplemented with the acceptance and refusal information. The reception processing section 24a cannot receive the vehicle information supplemented with the acceptance and refusal information. Alternatively, suppose that the target vehicle is mounted with the driving assistance unit 1 but cannot perform inter-vehicle communication due to radio disturbance. Also in this case, the reception processing section 24a cannot receive the vehicle information supplemented with the acceptance and refusal information.

At S8, the acceptance and refusal information may indicate acceptance of the scheduled action content (S8: YES). The acceptance and refusal information is supplemented to the vehicle information the reception processing section 24a receives from the target vehicle at S8. In this case, the driving assistance ECU 2a proceeds to S9. The acceptance and refusal information may indicate refusal of the scheduled action content (S8: NO). In this case, the processing proceeds to S12.

At S9, the notification processing section 32a allows the display apparatus 11a or the audio output apparatus 12a to notify the driver of vehicle A1 that the target vehicle's driver accepts the scheduled action content of vehicle A1.

At S10, the action start determination section 28a determines whether vehicle A1 starts action corresponding to the scheduled action content, based on the vehicle information acquired by the host vehicle information acquisition section 22a. In CASE1, the action start determination section 28a determines that vehicle A1 starts action when a steering angle changes to be larger than or equal to a specified value. The steering angle is contained in the vehicle information acquired by the host vehicle information acquisition section 22a. The specified value signifies a predetermined value that approximates to a steering angle appropriate for the vehicle to change the lane.

Also in CASE1, suppose that vehicle A1 is mounted with a camera to capture a road surface ahead of vehicle A1 and the obstacle detection section 21a detects a separation line using a publicly known image recognition technology based on an image captured by the camera. In this case, the action start determination section 28a determines that vehicle A1 starts action when vehicle A1 crosses the separation line belonging to the lane to which vehicle A1 is going to change the lane.

In CASE2 through CASE6, the action start determination section 28a determines that vehicle A1 starts action when an acceleration changes to be larger than or equal to a specified value. The acceleration is contained in the vehicle information acquired by the host vehicle information acquisition section 22a. The specified value signifies a predetermined value that approximates to an acceleration or higher appropriate for the vehicle to start from the stop state or change to a normal travel (e.g., 30 to 50 km/h) from a low-speed travel. In CASE4, the action start determination section 28a determines that vehicle A1 starts action when the obstacle detection section 21a detects a separation line using a publicly known image recognition technology based on an image captured by a camera to capture the road ahead of vehicle A1 and vehicle A1 crosses the separation line (i.e., centerline) to the right.

At S11, the transmission processing section 23a transmits the vehicle information acquired by the host vehicle information acquisition section 22a from the inter-vehicle communicator 3a at a specified cycle. At this time, the transmission processing section 23a supplements the vehicle information to be transmitted with the identification information about the target vehicle specified at S3 and gratitude information to express gratitude to the target vehicle's driver.

At S12, the acceptance and refusal information received from the target vehicle may refuse the scheduled action content. In this case, the notification processing section 32a allows the display apparatus 11a or the audio output apparatus 12a to notify the driver of vehicle A1 that the target vehicle's driver refuses the scheduled action content of vehicle A1.

At S13, the compromise acceptance and refusal confirmation-related process may reach termination timing (S13: YES). In this case, the driving assistance ECU 2a terminates the compromise acceptance and refusal confirmation-related process. The compromise acceptance and refusal confirmation-related process may not reach the termination timing (S13: NO). In this case, the driving assistance ECU 2a returns to S1 and repeats the process. Turning off an ignition power supply of the host vehicle is an example of the timing to terminate the compromise acceptance and refusal confirmation-related process.

<Compromise Acceptance and Refusal Transmission-Related Process>

Figure 6:
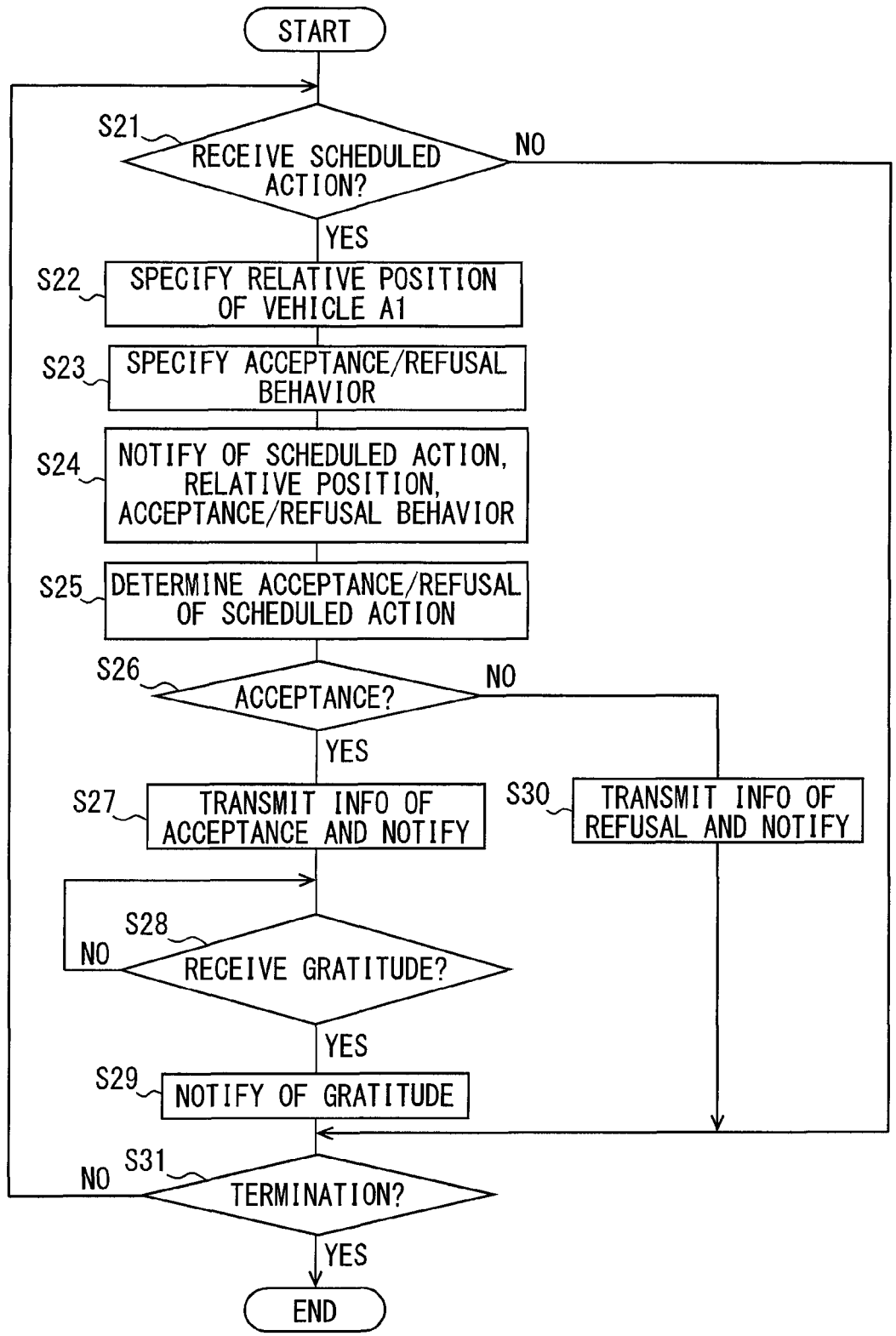
FIG. 6 is a flowchart illustrating a sequence of a compromise acceptance and refusal transmission-related process in the driving assistance ECU.

The description below explains a sequence of the above-mentioned compromise acceptance and refusal transmission-related process in the driving assistance ECU 2b of vehicle A2 to receive a scheduled action content from vehicle A1 with reference to a flowchart in FIG. 6. The flowchart in FIG. 6 is assumed to start when an ignition power supply in vehicle A2 as the host vehicle turns on.

At S21, a reception processing section 24b may receive vehicle information from vehicle A1 (S21: YES). The vehicle information is supplemented with the scheduled action content of vehicle A1 and the identification information about vehicle A2. In this case, the processing proceeds to S22. The reception processing section 24b may not receive the vehicle information (S21: NO). In this case, the processing proceeds to S31. The reception processing section 24b corresponds to a second reception processing section.

At S22, an acceptance and refusal determination section 31b specifies a relative position of vehicle A1 with reference to vehicle A2 based on the position of vehicle A1 contained in the vehicle information received at S21 and the position and the traveling direction of vehicle A2 contained in the vehicle information acquired by the host vehicle information acquisition section 22b.

At S23, the acceptance and refusal determination section 31b references the correspondence relation between a scheduled action content stored in the correspondence relation storage 30b and an acceptance and refusal determination behavior to accept the scheduled action content of vehicle A1 based on the scheduled action content of vehicle A1 supplemented to the vehicle information received at S21 and specifies the acceptance and refusal determination behavior to accept the scheduled action content of vehicle A1.

The following are examples of the correspondence relation stored in the correspondence relation storage 30b. Acceptance and refusal determination behavior "decelerating the host vehicle" is associated with scheduled action content "cutting in ahead of the target vehicle" or scheduled action content "crossing ahead of the target vehicle." Acceptance and refusal determination behavior "moving the host vehicle to the left" is associated with scheduled action content "passing the target vehicle." Acceptance and refusal determination behavior "headlight flashing" is associated with scheduled action content "going before the target vehicle." Acceptance and refusal determination behavior "headlight flashing" may indicate how to specifically manipulate a light switch 9b for headlight flashing.

The acceptance and refusal determination behavior associated with the scheduled action content does not signify a special one, but an accustomed one for an experienced driver by manipulating the vehicle to transmit the driver's intention to the other vehicle. The correspondence relation storage 30b may store the correspondence relation between the scheduled action content and the acceptance and refusal determination behavior as a predetermined database or as a correspondence relation acquired by communication with an unshown center.

At S24, the notification processing section 32b allows a display apparatus 11b or an audio output apparatus 12b to issue a notification to the driver of vehicle A2, the notification indicating the scheduled action content of vehicle A1 contained in the vehicle information received at S21, the relative position of vehicle A1 specified at S22, and the acceptance and refusal determination behavior specified at S23. An example is audio output such as "The vehicle at the diagonally forward left of the host vehicle requests to cut in ahead of the host vehicle. Decelerate if you accept the request." The notification about the acceptance and refusal determination behavior may provide a manipulation method such as "pull the turn signal lamp lever toward you" to actualize the acceptance and refusal determination behavior.

At S25, the acceptance and refusal determination section 31b determines whether the driver of vehicle A2 accepts the scheduled action content of vehicle A1, depending on whether a behavior detection section 29b detects the acceptance and refusal determination behavior specified at S23. The behavior detection section 29b detects an acceptance and refusal determination behavior from the vehicle information acquired by the host vehicle information acquisition section 22b or the signal from the light switch 9b.

For example, the behavior detection section 29b detects acceptance and refusal determination behavior "decelerating the host vehicle" when the amount of braking effort applied to the brake pedal is contained in the vehicle information acquired by the vehicle information acquisition section 22b and is greater than or equal to a specified quantity. The behavior detection section 29b detects acceptance and refusal determination behavior "moving the host vehicle to the left" when the steering angle is contained in the vehicle information acquired by the vehicle information acquisition section 22b and changes to the left to be greater than or equal to a specified value. The behavior detection section 29b detects acceptance and refusal determination behavior "headlight flashing" when the light switch 9b inputs a signal indicating the headlight flashing.

The acceptance and refusal determination section 31b may determine that the driver of vehicle A2 refuses the scheduled action content of vehicle A1 when the acceptance and refusal determination behavior corresponds to "decelerating the host vehicle" and the behavior detection section 29b detects an acceleration of vehicle A2, namely, an behavior opposite to the acceptance and refusal determination behavior.

At S26, the acceptance and refusal determination section 31b may determine that the scheduled action content of vehicle A1 is accepted (S26: YES). In this case, the processing proceeds to S27. The acceptance and refusal determination section 31b may determine that the scheduled action content of vehicle A1 is refused (S26: NO). In this case, the processing proceeds to S30.

At S27, the transmission processing section 23b transmits the vehicle information acquired by the host vehicle information acquisition section 22b from the inter-vehicle communicator 3b at a specified cycle. At this time, the transmission processing section 23b supplements the vehicle information to be transmitted with the acceptance and refusal information and the identification information. The acceptance and refusal information indicates that the scheduled action content of vehicle A1 is accepted. The identification information concerns the vehicle (vehicle A1 according to the embodiment) as an origin of transmitting the scheduled action content received at S21. The transmission processing section 23b corresponds to a second transmission processing section.

At S27, the notification processing section 32b allows the display apparatus 11b or the audio output apparatus 12b to issue a notification to the driver of vehicle A2, the notification indicating that the driver of vehicle A2 accepts the scheduled action content of vehicle A1. The notification processing section 32b corresponds to a second notification processing section.

At S28, the reception processing section 24b may receive vehicle information from vehicle A1 (S28: YES). The vehicle information is supplemented with the gratitude information to express gratitude and the identification information about vehicle A2. In this case, the processing proceeds to S29. The reception processing section 24b may not receive the vehicle information (S28: NO). In this case, the processing repeats the process at S28.

At S29, the notification processing section 32b allows the display apparatus 11b or the audio output apparatus 12b to issue a notification indicating the gratitude from the driver of vehicle A1 to the driver of vehicle A2. An example is to generate an audio output such as "thank you for giving way" or to display an icon representing a character with the head lowered. The processing then proceeds to S31.

The acceptance and refusal determination section 31b may determine that the scheduled action content of vehicle A1 is refused. At S29 in this case, the transmission processing section 23b transmits the vehicle information acquired by the host vehicle information acquisition section 22b from the inter-vehicle communicator 3b at a specified cycle. At this time, the transmission processing section 23b supplements the vehicle information to be transmitted with the acceptance and refusal information and the identification information. The acceptance and refusal information indicates that the scheduled action content of vehicle A1 is refused. The identification information concerns the vehicle as an origin of transmitting the scheduled action content received at S21. The processing then proceeds to S31.

At S30, the notification processing section 32b allows the display apparatus 11b or the audio output apparatus 12b to issue a notification to the driver of vehicle A2, the notification indicating that the driver of vehicle A2 refuses the scheduled action content of vehicle A1.

At S31, the compromise acceptance and refusal transmission-related process may reach termination timing (S31: YES). In this case, the driving assistance ECU 2b terminates the compromise acceptance and refusal transmission-related process. The compromise acceptance and refusal transmission-related process may not reach the termination timing (S31: NO). In this case, the processing returns to S21 and repeats the process. Turning off the ignition power supply of the host vehicle is an example of the timing to terminate the compromise acceptance and refusal transmission-related process.

Summary of First Embodiment

In a situation that requires compromise between vehicles A1 and A2, the inter-vehicle communication according to the first embodiment transmits a scheduled action content of vehicle A1 appropriate for the situation, to vehicle A2 as a target vehicle for the compromise. The scheduled action content enables the driver of vehicle A2 to perceive an intention of the driver of vehicle A1.

In response to the transmitted scheduled action content, vehicle A2 returns the acceptance and refusal information indicating acceptance or refusal of the scheduled action content. Based on the acceptance and refusal information, the driver of vehicle A1 is supplied with a notification indicating whether the driver of vehicle A2 accepts the scheduled action content. The driver of vehicle A1 can more reliably confirm whether the driver of vehicle A2 accepts or refuses the scheduled action content. The drivers can more reliably transmit their intentions to each other in a situation that requires compromise between vehicles. This can reduce wasted time during which the drivers unsuccessfully guess the situation or attempt to simultaneously take action to give way while communication between the vehicles remains unclear.

The driver of vehicle A1 can confirm that the driver of vehicle A2 refuses the scheduled action content. The driver of vehicle A1 can clearly notice that the driver needs to give the right of a course to vehicle A2. This can prevent a situation where the driver of vehicle A1 behaves unreasonably to hinder a smooth travel. The driver of vehicle A2 can also reliably transmit refusal of the scheduled action content to the driver of vehicle A1. The driver of vehicle A2 can safely continue traveling the course.

Further, the first embodiment can solve a typical issue where a driver's driving manipulation inadvertently gives the right of way despite the intention of the driver. The following are examples where a driver's driving manipulation inadvertently gives the right of way despite the intention of the driver.

As an example, a driver of a vehicle to be cut in does not notice operation of a turn signal lamp of a vehicle that is going to cut in. In this situation, the driver accidentally keeps a cut-in space without acceleration. A driver of the vehicle going to cut in misguidedly considers that he or she is allowed to cut in though the driver of the vehicle to be cut in does not intend to give way.

As another example, drivers may use the headlight flashing with or without the intention of giving way. A driver may use the headlight flashing without the intention of giving way. The other driver may misguidedly consider that he or she is given the right of way.

In such a case, drivers attempt to simultaneously take action to give way to each other though the drivers do not intend to give way. Wasted time is spent.

According to the first embodiment, however, the behavior detection section 29b detects an acceptance and refusal determination behavior corresponding to the scheduled action content of vehicle A1. When the scheduled action content is accepted, this is notified to the driver of vehicle A2. This enables the driver of vehicle A2 to recognize that the driver per se of vehicle A2 has accepted the scheduled action content of vehicle A1 even when manipulating vehicle A2 to inadvertently give way without intending to accept the scheduled action content. The driver of vehicle A2 can thereby give way to vehicle A1 despite the intention. This can reduce wasted time during which the driver of vehicle A2 attempts to take action to give way simultaneously with vehicle A1.

According to the first embodiment, vehicle A1 starts action corresponding to the scheduled action content and transmits the gratitude information to vehicle A2 as a target vehicle for the compromise. Vehicle A2 issues a notification indicating the gratitude based on the gratitude information. The driver of vehicle A2 accepts the gratitude and can continue driving comfortably. The driver of vehicle A2 is notified of the gratitude and thereby can also recognize that vehicle A1 starts action corresponding to the scheduled action content. This can reliably inform the driver of vehicle A2 that vehicle A1 starts action corresponding to the scheduled action content.

The first embodiment automatically allows vehicle A1 to specify a scheduled action content and vehicle A2 to determine whether the scheduled action content is accepted or refused. The driver only needs to perform ordinary driving manipulation in a situation where vehicles need to compromise with each other. As another advantage, there is no need to force the driver into new input manipulation not included in the ordinary driving manipulation in a situation where vehicles need to compromise with each other.

Further, the first embodiment notifies a driver of the acceptance and refusal determination behavior corresponding to an accustomed vehicle manipulation an experienced driver performs to transmit his or her intention to the other vehicle. Even a beginner driver can drive the vehicle to give the right of way like an experienced driver based on the notified acceptance and refusal determination behavior. This can improve the driver's driving capability.

(First Modification)

The correspondence relation storage 30 may store the correspondence relation between the scheduled action content and the acceptance and refusal determination behavior on a region basis. The acceptance and refusal determination section may specify the acceptance and refusal determination behavior corresponding to a region where the host vehicle is located (first modification hereinafter). The description below explains the first modification. For illustration, the same reference numerals or symbols are given to members having the same functions as those of the members in the drawings used to explain the above-mentioned embodiment and a detailed description is omitted.

The driving assistance system 100 according to the first modification equals the driving assistance system 100 according to the first embodiment except that: the correspondence relation storage 30 stores a partially different correspondence relation; the driving assistance ECU 2 includes a region specification section 33; and the compromise acceptance and refusal transmission-related process is partially different.

<Detailed Configuration of Driving Assistance ECU 2 According to First Modification>

Figure 7:
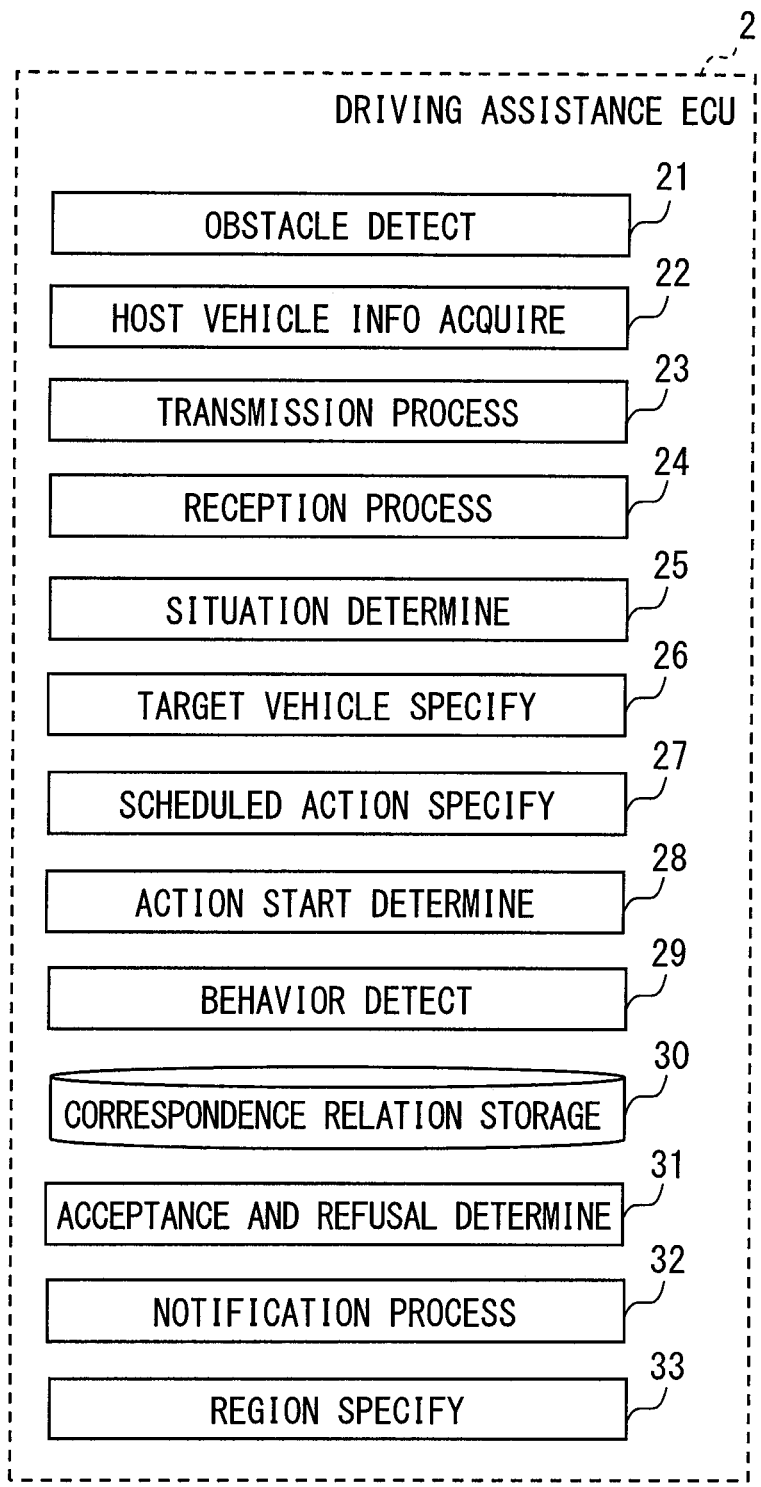
FIG. 7 is a block diagram illustrating a schematic configuration of a driving assistance ECU according to a first modification.

As in FIG. 7, the driving assistance ECU 2 according to the first modification includes the obstacle detection section 21, the host vehicle information acquisition section 22, the transmission processing section 23, the reception processing section 24, the situation determination section 25, the target vehicle specification section 26, the scheduled action specification section 27, the action start determination section 28, the behavior detection section 29, the correspondence relation storage 30, the acceptance and refusal determination section 31, the notification processing section 32, and the region specification section 33.

The correspondence relation storage 30 according to the first modification stores the correspondence relation between the scheduled action content and the acceptance and refusal determination behavior on a region basis. The region signifies a city unit, a prefecture unit, or a district unit such as the midland.

The region specification section 33 specifies a region where the host vehicle is located, based on the host vehicle position and the map data stored in the map DB 6. The host vehicle position is included in the vehicle information acquired by the host vehicle information acquisition section 22. The region here is assumed to equal the region as a unit used to segment the correspondence relation in the correspondence relation storage 30.

<Compromise Acceptance and Refusal Transmission-Related Process in First Modification>

The compromise acceptance and refusal transmission-related process according to the first modification equals the compromise acceptance and refusal transmission-related process according to the first embodiment except that a different process specifies the acceptance and refusal determination behavior. In the compromise acceptance and refusal transmission-related process according to the first modification, the acceptance and refusal determination section 31 references the regional correspondence relation stored in the correspondence relation storage 30 based on the region specified by the region specification section 33 and the scheduled action content received from the other vehicle requiring the compromise. The acceptance and refusal determination section 31 specifies the acceptance and refusal determination behavior corresponding to the scheduled action content of the other vehicle in the region where the host vehicle is located. The acceptance and refusal determination section 31 determines whether the host vehicle's driver accepts the other vehicle's scheduled action content, depending on whether the behavior detection section 29 detects the specified acceptance and refusal determination behavior.

<Summary of First Modification>

The first modification can specify an acceptance and refusal determination behavior appropriate for a region even if a sign to give way, namely, the acceptance and refusal determination behavior to accept the scheduled action content differs from region to region.

Suppose that the headlight flashing is used to give way in a region. In this case, the headlight flashing, when used, transmits the acceptance and refusal information indicating acceptance of the other vehicle's scheduled action content to the other vehicle. Suppose that the headlight flashing is used to demand to give way in another region. In this case, the headlight flashing, when used, can disallow transmission of the acceptance and refusal information indicating acceptance of the other vehicle's scheduled action content to the other vehicle. Thus, this can avoid unsuccessful communication due to different signs to give way depending on regions in a situation that requires compromise between vehicles.

(Second and Third Modifications)

According to the above-mentioned embodiment, the situation determination section 25 reads a lane change from a signal supplied from the turn signal lamp switch 8. However, the present disclosure is not limited thereto. For example, suppose the configuration can acquire information about a recommended route in the route guidance from a navigation system. In this case, the configuration may read a lane change based on a course that can be estimated from the position of the host vehicle in the recommended route (second modification hereafter).

Suppose that the host vehicle is mounted with a publicly known driver status monitor to recognize an image of the driver's face or body captured by a camera and detect motion of the driver's face, line of sight, or body. In this case, the configuration may read a lane change based on the orientation of the face or the line of sight detected by the driver status monitor (third modification hereinafter). The configuration may read a lane change to the side where a side mirror is positioned if the face or the line of sight is frequently oriented to the side mirror.

(Fourth Modification)

The above-mentioned embodiment uses acceptance and refusal determination behaviors of the host vehicle such as "decelerating the host vehicle," "moving the host vehicle to the left," and "headlight flashing." However, the disclosure is not limited thereto. Suppose that the driver status monitor is mounted on the host vehicle. In such a case, the driver's behavior such as raising his or her hand may be used as an acceptance and refusal determination behavior (fourth modification hereinafter). In this case, the behavior detection section 29 detects the driver's behavior such as raising his or her hand based on a detection result from the driver status monitor.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A driving assistance apparatus mounted to a vehicle, comprising:
    a transmission processing section that transmits information to a nearby vehicle from the vehicle using inter-vehicle communication;
    a reception processing section that receives information transmitted from a nearby vehicle using inter-vehicle communication;
    a notification processing section that issues a notification to a driver of the vehicle;
    a situation determination section that determines whether a situation requires compromise between the vehicle and a nearby vehicle;
    a target vehicle specification section that specifies a target vehicle as the nearby vehicle that requires compromise with the vehicle; and a scheduled action specification section that specifies a scheduled action content of the vehicle in a situation that is determined by the situation determination section to require compromise, wherein:

the transmission processing section transmits the scheduled action content specified by the scheduled action specification section to the target vehicle;

when the reception processing section receives acceptance and refusal information indicating one of acceptance and refusal of the scheduled action content from the target vehicle in response to the scheduled action content transmitted from the transmission processing section, the notification processing section issues a notification indicating whether a driver of the target vehicle accepts the scheduled action content based on the received acceptance and refusal information; and when the reception processing section fails to receive the acceptance and refusal information from the target vehicle in response to the scheduled action content transmitted from the transmission processing section, the notification processing section issues a notification to a driver of the vehicle, the notification indicating that a driver of the vehicle fails to receive support from the driving assistance apparatus in a situation that is determined by the situation determination section to require compromise.

2. The driving assistance apparatus according to claim 1, wherein the transmission processing section transmits, to the target vehicle, gratitude information expressing gratitude to a driver of the target vehicle when the acceptance and refusal information received by the reception processing section from the target vehicle indicates that a driver of the target vehicle accepts the scheduled action content.

3. The driving assistance apparatus according to claim 1, further comprising an acceptance and refusal determination section that determines whether a driver of the vehicle accepts a scheduled action content of a nearby vehicle when the reception processing section receives the scheduled action content of the nearby vehicle transmitted from the nearby vehicle to the vehicle, wherein the transmission processing section transmits acceptance and refusal information to the nearby vehicle, the acceptance and refusal information indicating whether the acceptance and refusal determination section determines that a driver of the vehicle accepts the scheduled action content of the nearby vehicle.

4. The driving assistance apparatus according to claim 3, further comprising:

a behavior detection section that detects an acceptance and refusal determination behavior corresponding to at least one of a behavior of the vehicle and a behavior of a driver of the vehicle; and a correspondence relation storage that stores correspondence relation between the scheduled action content of the nearby vehicle and the acceptance and refusal determination behavior to accept the scheduled action content, wherein the acceptance and refusal determination section references the correspondence relation stored in the correspondence relation storage, based on the scheduled action content of the nearby vehicle received by the reception processing section and the acceptance and refusal determination behavior detected by the behavior detection section, and determines whether a driver of the vehicle accepts the scheduled action content of the nearby vehicle.

5. The driving assistance apparatus according to claim 4, further comprising a region specification section that specifies a vehicle position of the vehicle, wherein:

the correspondence relation storage stores the correspondence relation with respect to each of regions; and the acceptance and refusal determination section uses (i) a region including the vehicle position specified by the region specification section, and (ii) the acceptance and refusal determination behavior detected by the behavior detection section, in order to reference the correspondence relation with respect to the region including the vehicle position in the correspondence relation storage, and the acceptance and refusal determination section thereby determines whether a driver of the vehicle accepts the scheduled action content of the nearby vehicle.

6. The driving assistance apparatus according to claim 3, wherein when the acceptance and refusal determination section determines that a driver of the vehicle accepts the scheduled action content of the nearby vehicle, the notification processing section issues a notification to a driver of the vehicle to indicate that the scheduled action content of the nearby vehicle is accepted, whereas when the acceptance and refusal determination section determines that a driver of the vehicle refuses the scheduled action content of the nearby vehicle, the notification processing section issues a notification to a driver of the vehicle to indicate that the scheduled action content of the nearby vehicle is refused.

7. The driving assistance apparatus according to claim 3, wherein when the reception processing section receives gratitude information expressing gratitude to a driver of the vehicle from a nearby vehicle having transmitted the acceptance and refusal information, the notification processing section issues a notification to a driver of the vehicle to express gratitude from a driver of the nearby vehicle.

8. A driving assistance system including a first driving assistance apparatus mounted to a first vehicle and a second driving assistance apparatus mounted to a nearby vehicle that surrounds the first vehicle, the first driving assistance apparatus comprising:

a first transmission processing section that transmits information from the first vehicle using inter-vehicle communication;

a first reception processing section that receives information transmitted using inter-vehicle communication;

a first notification processing section that issues a notification to a driver of the vehicle;

a situation determination section that determines whether a situation requires compromise between the first vehicle and a nearby vehicle;

a target vehicle specification section that specifies a second vehicle as the nearby vehicle that requires compromise with the first vehicle; and a scheduled action specification section that specifies a scheduled action content of the first vehicle in a situation that is determined by the situation determination section to require compromise, wherein the first transmission processing section transmits the scheduled action content specified by the scheduled action specification section to the second vehicle, the second driving assistance apparatus comprising:

a second transmission processing section that transmits information from the second vehicle using inter-vehicle communication;

a second reception processing section that receives information transmitted using inter-vehicle communication;

a second notification processing section that issues a notification indicating the scheduled action content of the first vehicle to a driver of the second vehicle when the scheduled action content transmitted from the first vehicle to the second vehicle is received by the second reception processing section; and an acceptance and refusal determination section that determines whether a driver of the second vehicle accepts the scheduled action content of the first vehicle when the scheduled action content transmitted from the first vehicle to the second vehicle is received by the second reception processing section, wherein the second transmission processing section transmits, to the first vehicle, acceptance and refusal information indicating whether the acceptance and refusal determination section determines that the driver of the second vehicle accepts the scheduled action content of the first vehicle, wherein when the acceptance and refusal information from the second vehicle is received by the first reception processing section of the first vehicle, the first notification processing section of the first vehicle issues, to the driver of the first vehicle, a notification indicating whether the driver of the second vehicle accepts the scheduled action content based on the received acceptance and refusal information, whereas when the acceptance and refusal information from the second vehicle is not received by the first reception processing section of the first vehicle, the first notification processing section of the first vehicle issues, to the driver of the first vehicle, a notification indicating that the driver of the first vehicle fails to receive support from the first driving assistance apparatus in a situation that is determined by the situation determination section to require compromise.

9. A driving assistance apparatus mounted to a vehicle, comprising:

a transmission processing section that transmits information to a nearby vehicle from the vehicle using inter-vehicle communication;

a reception processing section that receives information transmitted from a nearby vehicle using inter-vehicle communication;

a notification processing section that issues a notification to a driver of the vehicle;

a situation determination section that determines whether a situation requires compromise between the vehicle and a nearby vehicle;

a target vehicle specification section that specifies a target vehicle as the nearby vehicle that requires compromise with the vehicle; and a scheduled action specification section that specifies a scheduled action content of the vehicle in a situation that is determined by the situation determination section to require compromise, wherein:

the transmission processing section transmits the scheduled action content specified by the scheduled action specification section to the target vehicle; and when the reception processing section receives acceptance and refusal information indicating one of acceptance and refusal of the scheduled action content from the target vehicle in response to the scheduled action content transmitted from the transmission processing section, the notification processing section issues a notification indicating whether a driver of the target vehicle accepts the scheduled action content based on the received acceptance and refusal information, the driving assistance apparatus further comprising:

an acceptance and refusal determination section that determines whether a driver of the vehicle accepts a scheduled action content of a nearby vehicle when the reception processing section receives the scheduled action content of the nearby vehicle transmitted from the nearby vehicle to the vehicle;

a behavior detection section that detects an acceptance and refusal determination behavior corresponding to at least one of a behavior of the vehicle and a behavior of a driver of the vehicle; and a correspondence relation storage that stores correspondence relation between the scheduled action content of the nearby vehicle and the acceptance and refusal determination behavior to accept the scheduled action content, wherein:

the acceptance and refusal determination section references the correspondence relation stored in the correspondence relation storage, based on (i) the scheduled action content of the nearby vehicle received by the reception processing section and (ii) the acceptance and refusal determination behavior detected by the behavior detection section, and determines whether a driver of the vehicle accepts the scheduled action content of the nearby vehicle; and the transmission processing section transmits acceptance and refusal information to the nearby vehicle, the acceptance and refusal information indicating whether the acceptance and refusal determination section determines that a driver of the vehicle accepts the scheduled action content of the nearby vehicle.

10. The driving assistance apparatus according to claim 9, further comprising a region specification section that specifies a vehicle position of the vehicle, wherein:

the correspondence relation storage stores the correspondence relation with respect to each of regions; and the acceptance and refusal determination section uses (i) a region including the vehicle position specified by the region specification section, and (ii) the acceptance and refusal determination behavior detected by the behavior detection section, in order to reference the correspondence relation with respect to the region including the vehicle position in the correspondence relation storage, and the acceptance and refusal determination section thereby determines whether a driver of the vehicle accepts the scheduled action content of the nearby vehicle.

11. The driving assistance apparatus according to claim 9, wherein when the acceptance and refusal determination section determines that a driver of the vehicle accepts the scheduled action content of the nearby vehicle, the notification processing section issues a notification to a driver of the vehicle to indicate that the scheduled action content of the nearby vehicle is accepted, whereas when the acceptance and refusal determination section determines that a driver of the vehicle refuses the scheduled action content of the nearby vehicle, the notification processing section issues a notification to a driver of the vehicle to indicate that the scheduled action content of the nearby vehicle is refused.

12. The driving assistance apparatus according to claim 9, wherein when the reception processing section receives gratitude information expressing gratitude to a driver of the vehicle from a nearby vehicle having transmitted the acceptance and refusal information, the notification processing section issues a notification to a driver of the vehicle to express gratitude from a driver of the nearby vehicle.

13. The driving assistance apparatus according to claim 9, wherein the transmission processing section transmits, to the target vehicle, gratitude information expressing gratitude to a driver of the target vehicle when the acceptance and refusal information received by the reception processing section from the target vehicle indicates that a driver of the target vehicle accepts the scheduled action content.

14. A driving assistance system including a first driving assistance apparatus mounted to a first vehicle and a second driving assistance apparatus mounted to a nearby vehicle that surrounds the first vehicle, the first driving assistance apparatus comprising:

a first transmission processing section that transmits information from the first vehicle using inter-vehicle communication;

a first reception processing section that receives information transmitted using inter-vehicle communication;

a first notification processing section that issues a notification to a driver of the vehicle;

a situation determination section that determines whether a situation requires compromise between the first vehicle and a nearby vehicle;

a target vehicle specification section that specifies a second vehicle as the nearby vehicle that requires compromise with the first vehicle; and a scheduled action specification section that specifies a scheduled action content of the first vehicle in a situation that is determined by the situation determination section to require compromise, wherein the first transmission processing section transmits the scheduled action content specified by the scheduled action specification section to the second vehicle, the second driving assistance apparatus comprising:

a second transmission processing section that transmits information from the second vehicle using inter-vehicle communication;

a second reception processing section that receives information transmitted using inter-vehicle communication;

a second notification processing section that issues a notification indicating the scheduled action content of the first vehicle to a driver of the second vehicle when the scheduled action content transmitted from the first vehicle to the second vehicle is received by the second reception processing section;

an acceptance and refusal determination section that determines whether a driver of the second vehicle accepts the scheduled action content of the first vehicle when the scheduled action content transmitted from the first vehicle to the second vehicle is received by the second reception processing section;

a behavior detection section that detects an acceptance and refusal determination behavior corresponding to at least one of a behavior of the second vehicle and a behavior of a driver of the second vehicle; and a correspondence relation storage that stores correspondence relation between the scheduled action content of the first vehicle and the acceptance and refusal determination behavior to accept the scheduled action content, wherein the acceptance and refusal determination section
references the correspondence relation stored in the correspondence relation storage, based on the scheduled action content of the first vehicle received by the second reception processing section and the acceptance and refusal determination behavior detected by the behavior detection section, and
determines whether a driver of the second vehicle accepts the scheduled action content of the first vehicle, wherein the second transmission processing section transmits, to the first vehicle, acceptance and refusal information indicating whether the acceptance and refusal determination section determines that the driver of the second vehicle accepts the scheduled action content of the first vehicle, wherein when the acceptance and refusal information from the second vehicle is received by the first reception processing section of the first vehicle, the first notification processing section of the first vehicle issues, to the driver of the first vehicle, a notification indicating whether the driver of the second vehicle accepts the scheduled action content based on the received acceptance and refusal information.

15. A driving assistance apparatus mounted to a vehicle, comprising:

a transmission processing section that transmits information to a nearby vehicle from the vehicle using inter-vehicle communication;

a reception processing section that receives information transmitted from a nearby vehicle using inter-vehicle communication;

a notification processing section that issues a notification to a driver of the vehicle;

a situation determination section that determines whether a situation requires compromise between the vehicle and a nearby vehicle;

a target vehicle specification section that specifies a target vehicle as the nearby vehicle that requires compromise with the vehicle; and a scheduled action specification section that specifies a scheduled action content of the vehicle in a situation that is determined by the situation determination section to require compromise, wherein:

the transmission processing section transmits the scheduled action content specified by the scheduled action specification section to the target vehicle; and when the reception processing section receives acceptance and refusal information indicating one of acceptance and refusal of the scheduled action content from the target vehicle in response to the scheduled action content transmitted from the transmission processing section, the notification processing section issues a notification indicating whether a driver of the target vehicle accepts the scheduled action content based on the received acceptance and refusal information, the driving assistance apparatus further comprising:

an acceptance and refusal determination section that determines whether a driver of the vehicle accepts a scheduled action content of a nearby vehicle when the reception processing section receives the scheduled action content of the nearby vehicle transmitted from the nearby vehicle to the vehicle, wherein the transmission processing section transmits acceptance and refusal information to the nearby vehicle, the acceptance and refusal information indicating whether the acceptance and refusal determination section determines that a driver of the vehicle accepts the scheduled action content of the nearby vehicle, wherein when the acceptance and refusal determination section determines that a driver of the vehicle accepts the scheduled action content of the nearby vehicle, the notification processing section issues a notification to a driver of the vehicle to indicate that the scheduled action content of the nearby vehicle is accepted, whereas when the acceptance and refusal determination section determines that a driver of the vehicle refuses the scheduled action content of the nearby vehicle, the notification processing section issues a notification to a driver of the vehicle to indicate that the scheduled action content of the nearby vehicle is refused.

16. The driving assistance apparatus according to claim 15, wherein when the reception processing section receives gratitude information expressing gratitude to a driver of the vehicle from a nearby vehicle having transmitted the acceptance and refusal information, the notification processing section issues a notification to a driver of the vehicle to express gratitude from a driver of the nearby vehicle.

17. The driving assistance apparatus according to claim 15, wherein the transmission processing section transmits, to the target vehicle, gratitude information expressing gratitude to a driver of the target vehicle when the acceptance and refusal information received by the reception processing section from the target vehicle indicates that a driver of the target vehicle accepts the scheduled action content.

18. A driving assistance system including a first driving assistance apparatus mounted to a first vehicle and a second driving assistance apparatus mounted to a nearby vehicle that surrounds the first vehicle, the first driving assistance apparatus comprising:

a first transmission processing section that transmits information from the first vehicle using inter-vehicle communication;

a first reception processing section that receives information transmitted using inter-vehicle communication;

a first notification processing section that issues a notification to a driver of the vehicle;

a situation determination section that determines whether a situation requires compromise between the first vehicle and a nearby vehicle;

a target vehicle specification section that specifies a second vehicle as the nearby vehicle that requires compromise with the first vehicle; and a scheduled action specification section that specifies a scheduled action content of the first vehicle in a situation that is determined by the situation determination section to require compromise, wherein the first transmission processing section transmits the scheduled action content specified by the scheduled action specification section to the second vehicle, the second driving assistance apparatus comprising:

a second transmission processing section that transmits information from the second vehicle using inter-vehicle communication;

a second reception processing section that receives information transmitted using inter-vehicle communication;

a second notification processing section that issues a notification indicating the scheduled action content of the first vehicle to a driver of the second vehicle when the scheduled action content transmitted from the first vehicle to the second vehicle is received by the second reception processing section; and an acceptance and refusal determination section that determines whether a driver of the second vehicle accepts the scheduled action content of the first vehicle when the scheduled action content transmitted from the first vehicle to the second vehicle is received by the second reception processing section, wherein the second transmission processing section transmits, to the first vehicle, acceptance and refusal information indicating whether the acceptance and refusal determination section determines that the driver of the second vehicle accepts the scheduled action content of the first vehicle, wherein when the acceptance and refusal information from the second vehicle is received by the first reception processing section of the first vehicle, the first notification processing section of the first vehicle issues, to the driver of the first vehicle, a notification indicating whether the driver of the second vehicle accepts the scheduled action content based on the received acceptance and refusal information, wherein when the acceptance and refusal determination section determines that a driver of the second vehicle accepts the scheduled action content of the first vehicle, the second notification processing section issues a notification to a driver of the second vehicle to indicate that the scheduled action content of the first vehicle is accepted, whereas when the acceptance and refusal determination section determines that a driver of the second vehicle refuses the scheduled action content of the first vehicle, the second notification processing section issues a notification to a driver of the second vehicle to indicate that the scheduled action content of the first vehicle is refused.

* * * * *